(12) United States Patent
Fatemi et al.

(10) Patent No.: US 12,074,485 B2
(45) Date of Patent: Aug. 27, 2024

(54) METHOD OF MAKING A ROTOR FOR AN ELECTRIC MACHINE AND SYSTEM THEREOF

(71) Applicant: GM GLOBAL TECHNOLOGY OPERATIONS LLC, Detroit, MI (US)

(72) Inventors: Alireza Fatemi, Canton, MI (US); Thomas W Nehl, Shelby Township, MI (US); Huaxin Li, Rochester Hills, MI (US); Anil K Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 90 days.

(21) Appl. No.: 17/648,568

(22) Filed: Jan. 21, 2022

(65) Prior Publication Data

US 2023/0291288 A1 Sep. 14, 2023

(51) Int. Cl.
| | |
|---|---|
| *H02K 15/02* | (2006.01) |
| *H02K 1/276* | (2022.01) |
| *H02K 15/03* | (2006.01) |
| *H02K 15/10* | (2006.01) |
| *H02K 15/12* | (2006.01) |

(52) U.S. Cl.
CPC ............. *H02K 15/03* (2013.01); *H02K 1/276* (2013.01); *H02K 15/12* (2013.01)

(58) Field of Classification Search
CPC ...... H02K 1/276; H02K 1/2766; H02K 15/03; H02K 15/12
See application file for complete search history.

(56) References Cited

U.S. PATENT DOCUMENTS

| | | | |
|---|---|---|---|
| 2015/0256035 A1 | 9/2015 | Kudose et al. | |
| 2016/0352164 A1* | 12/2016 | Mochida | ................. H02K 21/14 |
| 2020/0185985 A1* | 6/2020 | Blum | ....................... H02K 3/12 |

FOREIGN PATENT DOCUMENTS

| | | |
|---|---|---|
| CN | 109217591 A | 1/2019 |
| JP | 2013005553 A | 1/2013 |

\* cited by examiner

*Primary Examiner* — Paul D Kim
(74) *Attorney, Agent, or Firm* — Lorenz & Kopf, LLP

(57) ABSTRACT

A rotor for an electric machine includes strengthened structural elements effected through surface alloying and heating via an induction heating fixture. A rotor includes laminations formed to have internal cavities and structural members adjacent the cavities. A number of the laminations are stacked to form a lamination stack. An alloying material is applied to the lamination stack at the structural members. The lamination stack is placed in a fixture so that an inductor extends along the structural members and cooling elements extend through the cavities. A current is applied to the inductor to heat the structural members, alloying the alloying material into the structural members.

19 Claims, 8 Drawing Sheets

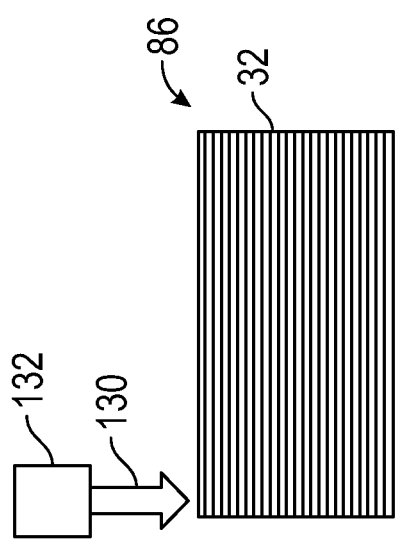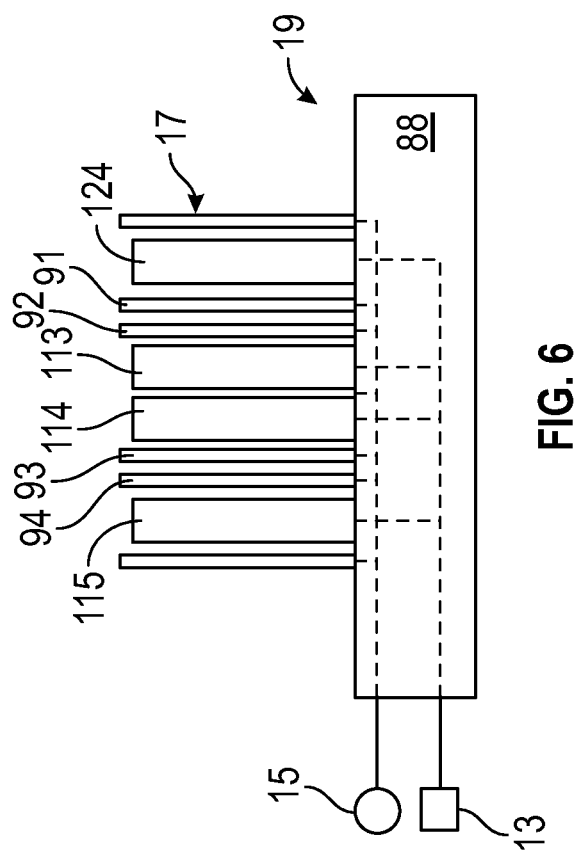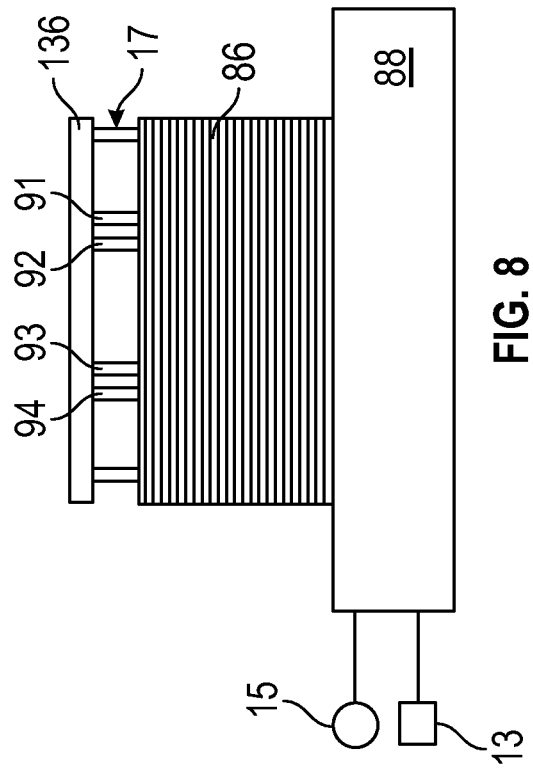

METHOD OF MAKING A ROTOR FOR AN ELECTRIC MACHINE AND SYSTEM THEREOF

INTRODUCTION

The present invention relates to laminations for electric machines and rotors thereof, and more particularly relates to rotors with a multitude of internal cavities having adjacent structural members that are strengthened by surface alloying and induction heating.

A rotor, such as for an interior permanent magnet (IPM) machine or a synchronous reluctance (SR) machine, includes a rotor core assembled around the rotation shaft. These rotors may have a segmental construction that includes a number of stacked laminations forming a core body. The core body may include internal cavities as flux barriers to influence operational characteristics of the machine. The laminations of the core body are formed in a disc shape with a center opening for assembly on a rotation shaft. The flux barriers are distributed around the shaft opening. The flux barrier cavities may or may not contain magnets or coils as magnetic elements.

The physical dimensions, number, and positioning of the flux barrier cavities influence the performance of the electric machine. Lamination features such as cavities and their structural features may affect operational parameters such as the speeds achievable by the electric machine without overly stressing the rotor core. Accordingly, rotor cavities are designed to achieve specific performance objectives, and modifying or adding cavities to change that design is not preferred. Structural support is needed around the cavities and may be provided in the form of bridges closing cavities at the outer perimeter of the lamination and struts that extend across the cavities. The amount of structural support needed increases with higher operational speeds.

Optimal performance and high rotor operating speeds are desirably achieved with adequate structural support to deliver efficiency and the durability of an electrical motor. Accordingly, it is desirable to provide economical rotors for electric machines that achieve high performance with structural durability. Furthermore, other desirable features and characteristics of the present invention will become apparent from the subsequent detailed description and the appended claims, taken in conjunction with the accompanying drawings and the foregoing technical field and background.

SUMMARY

Methods and systems include strengthening structural elements of a rotor for an electric machine, where the strengthening is effected through surface alloying and heating via an induction heating fixture. In various embodiments, a rotor for an electric machine includes laminations formed to have internal cavities and structural members adjacent the cavities. A number of the laminations are stacked to form a lamination stack. An alloying material is applied to the lamination stack at the structural members. The lamination stack is placed in a fixture so that an inductor extends along the structural members and cooling elements extend through the cavities. A current is applied to the inductor to heat the structural members, alloying the alloying material into the structural members.

Additional embodiments include assembling, after the alloying, a number of the lamination stacks onto a shaft to form the rotor.

In additional embodiments, the laminations are formed of electrical steel, the alloying material comprises an austenite former and the alloying comprises penetrating the austenite former into and completely through the structural members.

In additional embodiments, the structural members comprise plural bridges at an outer perimeter of the laminations, and the alloying comprises alloying the plural number of bridges simultaneously.

In additional embodiments, the inductor comprises first segments extending through the cavities adjacent each of the plural bridges, and second segments extending along the outer perimeter adjacent each of the bridges.

In additional embodiments, the inductor comprises first segments extending along the outer perimeter adjacent each of the bridges, and second segments extending along the outer perimeter adjacent each of the bridges, and comprising encircling the outer perimeter with a flux concentrator prior to the applying of the current.

Additional embodiments include selecting an excitation frequency for the current so that the alloying is effected completely through the structural members.

Additional embodiments include applying the current at varying excitation frequencies to generate a variable temperature profile in the structural members over time to heat a surface of the structural members at a first rate and to heat into the structural members from the surface at a second rate.

Additional embodiments include assembling magnetic elements into the cavities so that the magnetic elements are retained in the cavities by the structural members.

Additional embodiments include coating the laminations with an insulative material; and cooling, by the cooling elements, the lamination stack, preserving the insulative material except at the structural members.

In additional embodiments, a system for making a rotor for an electric machine includes a fixture having an inductor and cooling elements, the fixture configured to receive a lamination stack that comprises a stack of laminations and has cavities and structural members adjacent the cavities, so that the inductor extends along the structural members and the cooling elements extend through the cavities, wherein the fixture is configured to apply a current to the inductor to heat the structural members, alloying an alloying material into the structural members.

In additional embodiments, the lamination stack is configured to stack onto a shaft to form a portion of the rotor.

In additional embodiments, an applicator is configured to apply the alloying material to the lamination stack, wherein the laminations comprise electrical steel, the alloying material comprises an austenite former, and the fixture is configured to penetrate the austenite former into and completely through the structural members.

In additional embodiments, the structural members comprise plural bridges at an outer perimeter of the laminations, and the fixture is configured to heat the plural number of bridges simultaneously.

In additional embodiments, the inductor comprises first segments extending through the cavities adjacent each of the plural bridges, and second segments extending along the outer perimeter adjacent each of the bridges.

In additional embodiments, the inductor comprises first segments extending along the outer perimeter adjacent each of the bridges, and second segments extending along the outer perimeter adjacent each of the bridges, with a flux concentrator that encircles the outer perimeter.

In additional embodiments, the fixture is configured to apply an excitation frequency of the current so that the alloying is effected completely through the structural members.

In additional embodiments, the fixture is configured with an induction current generator to apply the current at varying excitation frequencies to generate a variable temperature profile in the structural members over time to heat a surface of the structural members at a first rate and to heat into the structural members from the surface at a second rate.

In additional embodiments, the laminations are coated with an insulative material, and the cooling elements are configured to cool the lamination stack, preserving the insulative material except at the structural members.

In additional embodiments, a rotor for an electric machine comprises a number of laminations, each having internal cavities and structural members adjacent the internal cavities, wherein the structural members are alloyed with a material for strength and comprise austenitic material through surface alloying followed by a local heat-treating, wherein the structural members comprise bridges at an outer perimeter of the laminations, and wherein the austenitic material extends completely through the bridges, and, wherein each of the cavities is defined between a first bridge of the bridges and a second bridge of the bridges, and wherein the cavities comprise completely open spaces between the first bridge and the second bridge.

DESCRIPTION OF THE DRAWINGS

The exemplary embodiments will hereinafter be described in conjunction with the following drawing figures, wherein like numerals denote like elements, and wherein:

FIG. 5 is a schematic illustration of applicator surface treatment of a partial lamination stack of the electrical machine of FIG. 2, in accordance with various embodiments;

FIG. 6 is a schematic illustration of a part of a fixture for processing the lamination stack of FIG. 4, in accordance with various embodiments;

FIG. 7 is a schematic illustration of the lamination stack of FIG. 4 in the part of the fixture of FIG. 6, in accordance with various embodiments;

FIG. 8 is a schematic illustration of processing the lamination stack of FIG. 4 in the fixture of FIG. 6 and the system of FIG. 1, in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 4:
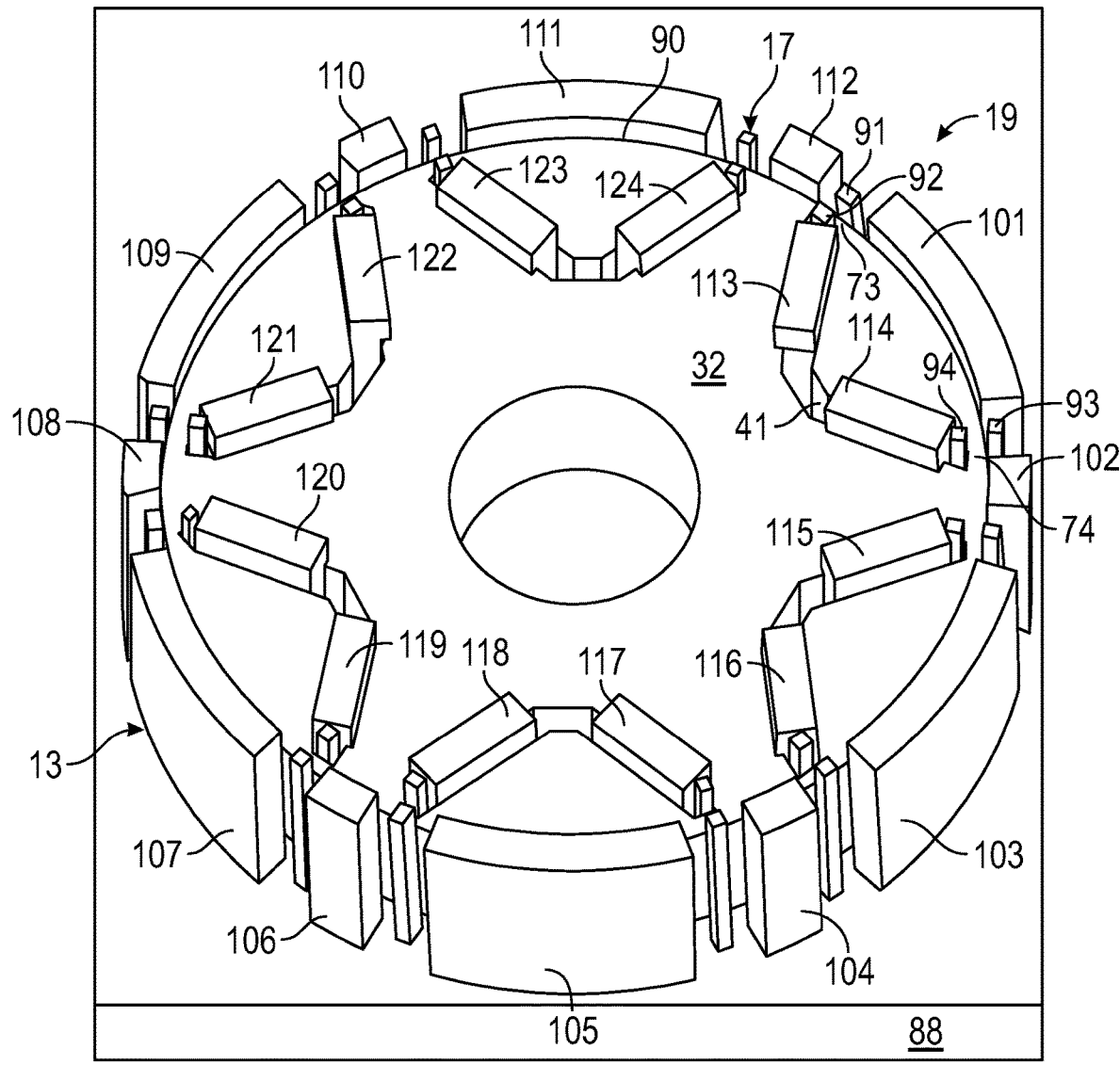
FIG. 4 is a schematic, perspective illustration of a of a partial lamination stack of the electrical machine of FIG. 2 as a workpiece in a fixture of the apparatus of FIG. 1, in accordance with various embodiments.
Figure 11:
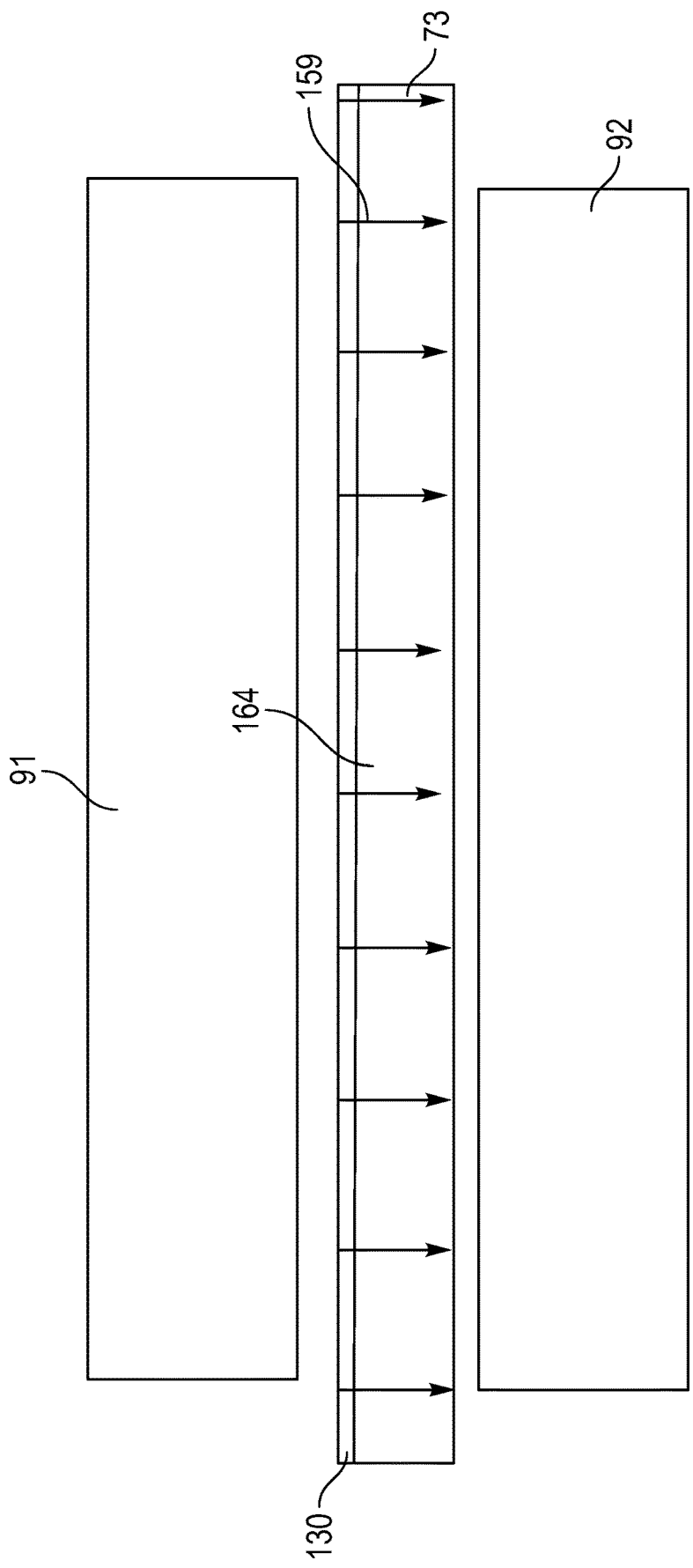
FIG. 11 is a schematic, sectional illustration of strengthening a structural member, in accordance with various embodiments.

As disclosed herein, optimized rotor magnetic characteristic and higher rotor operating speeds are achieved through surface alloying and induction treatments for structural integrity of the rotor. In the high-speed rotor, load-carrying inner struts are omitted from spanning across internal cavities to improve the magnetic performance of the rotor, such as by reducing magnetic leakage. Bridges present on the outer perimeter of the rotor laminations are elongated and thickened to compensate for the omitted struts. After stamping the rotor laminations, a multitude are stacked to form a rotor section. The inductors extend along the bridges as shown in FIGS. 4 and 11 and as further described below. For example, the inductors extend past each of the individual laminations in the stack and do so in a way that they induce heat generating fields in the bridges of the stack. The bridges are surface alloyed with an applied alloy such as an austenite former. The width of the surface alloy region may be equal to, or greater than, the stator to rotor airgap of the machine. The rotor section with applied alloy is inserted into an induction heating apparatus with a fixture tailored to the lamination stack. Through induction heating, the alloying material penetrates into the depth of the bridges.

In embodiments, rotor reinforcement through surface alloying subjected to local heat treatment targets the bridges, such as at their center areas. The bridges may be lengthened as much as the magnetic design allows, so that the thermal mass of the heat-treated areas, i.e., the centers of the bridges, is minimized, and the heat propagation to the other areas of the lamination is also minimized. After the laminations with their preferred design profiles are stamped, several are stacked to form a rotor core section. The outer surface of the rotor section over the center of the bridges is then alloyed such as with an austenite former material. For the alloying material to penetrate to the depth of the bridges, a subsequent heat treatment is applied. The heat treatment is tailored to ensure that the process does not damage the insulation coating on the lamination surfaces, and that the process does not result in lamination warpage/deformation. Induction heating may be used with an excitation frequency selected such that the skin depth of the impinging field is on the same order of the depth as the thickness of the bridges. This keeps the heat generation local to the rotor bridges and alloys the bridges throughout their width. The excitation frequency may be varied to obtain the optimal temperature profile versus depth and time. Cooling is applied to the internal cavities and/or at other available surfaces around the lamination stack to contain the temperature at the bridges and to protect of the rest of the lamination areas. The resultant rotor has bi-permeability laminations between the alloyed bridges and the other areas. By reducing magnetic leakage and by providing mechanical strengthening at the same time, mass reduction, lower piece cost, increased torque, reduced magnet content, high-speed operation, reduced active material mass and improved packaging may be beneficially achieved.

Figure 1:
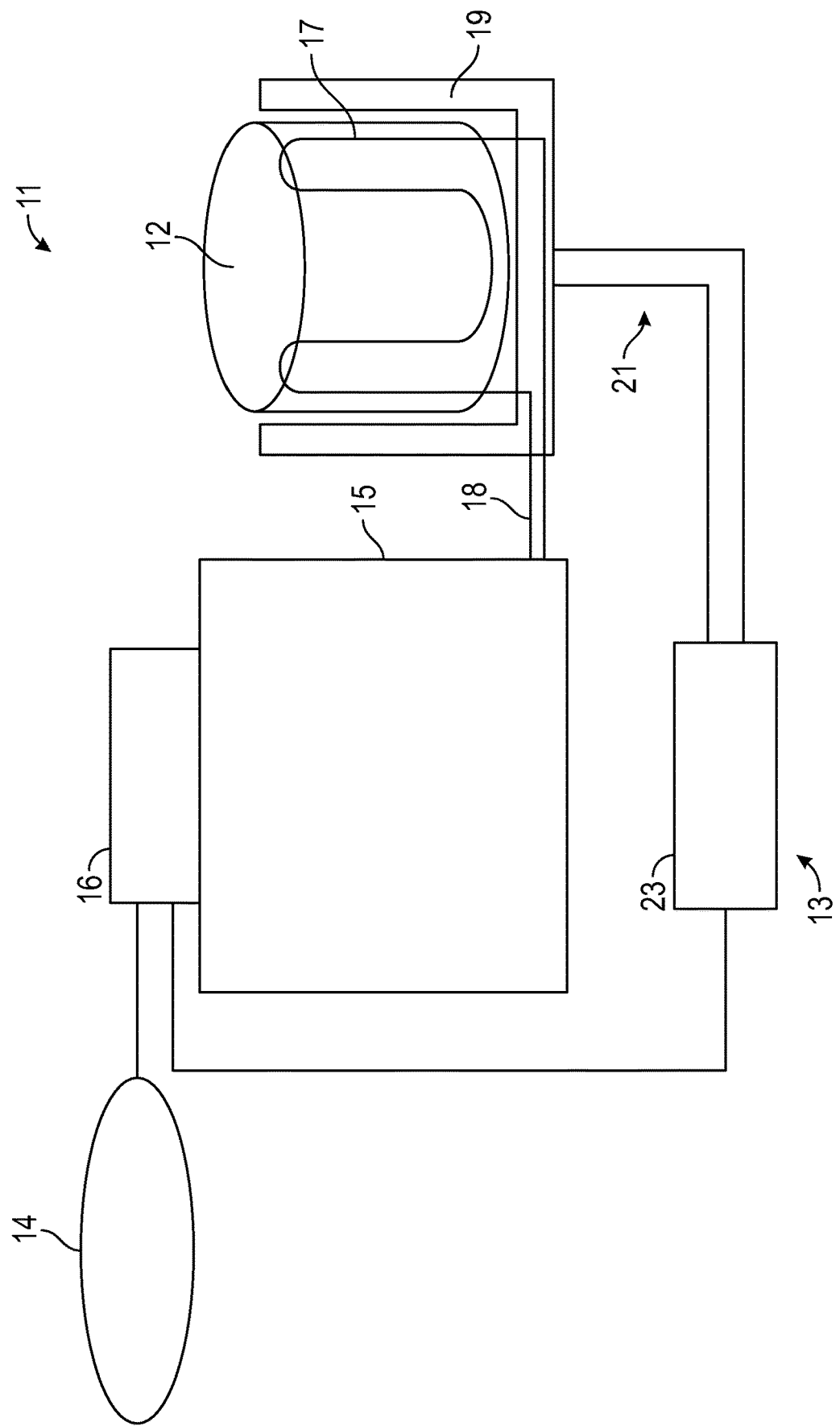
FIG. 1 is a schematic diagram of an induction treating system, in accordance with various embodiments.

Referring to FIG. 1, a system 11 is illustrated for induction heating a workpiece 12. The system 11 generally includes a power supply 14, an induction current generator 15, a controller 16, an induction heater coil/inductor 17, cables 18, a fixture 19, a cooling system 13, and the workpiece 12. A coolant supply 23 may also be included. The workpiece 12 is a metallic object with relatively narrow structural element parts that are desirably treated in the system 11, while the remainder of the workpiece 12 is not treated and not affected. In the current embodiment, the workpiece 12 is a stack of electric motor laminations as further described below. The fixture 19 is constructed with physical dimensions and features tailored to fit the workpiece 12 as further described below.

The power supply 14 may be a main power source such as three-phase, 480 volt, 60 Hz. grid power. The induction current generator 15 converts the main power to alternating current with an increased frequency, for example to the range of 23-900 kHz. and an output power of 200-500 kW or more. The output frequency of the induction current generator 15 is selected based on the desired depth of heating and may be determined by calculation and/or testing. Lower frequencies heat deeper into the workpiece 12, and higher frequencies heat only nearer to the surface. Power is selected based on the size and mass of the workpiece 12, and the length of the desired heating time, and may be determined by calculation and/or testing. The controller 16 is configured to control the induction current generator 15 to supply the selected output power to the inductor 17 for the selected time and at the desired frequency or frequencies. The inductor 17 may be a coiled conductor with a sinuous path with segments through or near the workpiece 12. The inductor 17 is shaped to run near the specified structural element areas of the workpiece 12 to heat and strengthen only the desired parts of the workpiece 12.

The inductor 17 is physically formed and placed close to the parts of the workpiece 12 to be heated. The inductor 17 conducts the high frequency current, induces currents in the workpiece 12 at an intensity and for a duration that is controlled and modulated by the controller 16. The heating occurs in the targeted areas of the workpiece 12 without physical contact. The inductor 17 is positioned to heat only the targeted parts of the workpiece 12 to be treated. Penetration depth of the generated currents is determined by the working frequency supplied by the induction current generator 15 through the cables 18. In the current embodiment, the penetration depth is tailored to treat the target areas of the workpiece 12 through their entire depth/thickness.

The cooling system 13, including the coolant supply 23, may be provided for areas of the workpiece 12 for which induction heating treatment is not desired. The cooling system 13 may be passive or active. In the current embodiment an active cooing system 13 is provided with the coolant supply 23 pumping a liquid coolant as controlled by the controller 16. The coolant is pumped through conduits 21 to the fixture 19 and around the workpiece 12 and/or through openings of the workpiece 12. In other embodiments, a passive cooling system 13 may be employed. For example, metal plates as heatsink structures may be located around the workpiece 12 and/or through openings in the workpiece 12 to receive heat transfer. The heatsink structures may be coupled with the fixture 19 for increased mass to receive the heat transfer and for assistance in dissipating the heat. The inductor 17 via its heating coils/conductors may be actively cooled as well, such as by the coolant supply 23 through use of hollow conductors.

Figure 2:
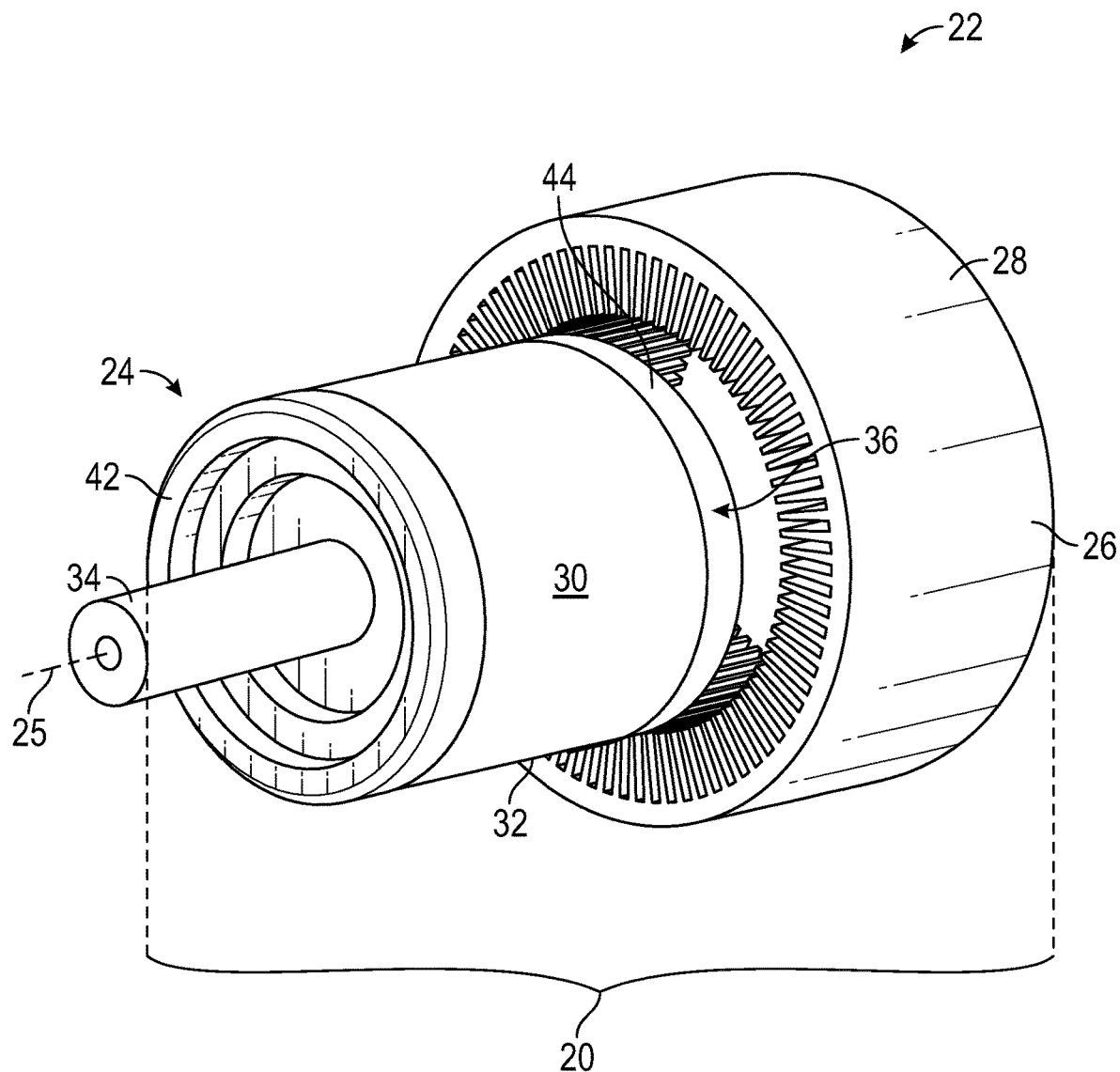
FIG. 2 is a schematic illustration of parts of an electric machine with components produced in the system of FIG. 1, in accordance with various embodiments.

Referring to FIG. 2, a product for utilization of the system 11 is schematically illustrated. In this embodiment, select components of an electric machine 20 are shown, including a stator assembly 22, and a rotor assembly 24 that is configured to rotate about an axis 25 through interaction with the stator assembly 22. In the illustration, the rotor assembly 24 is shown outside the stator assembly 22 for visibility. In this embodiment, the electric machine 20 is configured as a motor in which the current in the rotor assembly 24 that produces torque is induced from the magnetic field created by energization of the stator assembly 22. The rotor assembly 24 may include magnetic elements to interact with the induced field. In a number of embodiments, the electric machine 20 is an alternating current machine suitable for use in applications requiring regulated speed control such as for a vehicle traction motor, although this disclosure is not limited to those applications.

The stator assembly 22 is a generally annular shaped component, which may be constructed for single-phase power or multiple phase power such as, three-phase. In this embodiment, the stator assembly 22 includes a core 26 made of a stack of laminations 28. The laminations 28 may be formed by stampings that are slotted to receive windings (not shown), and are made of a soft magnetic material such as silicon steel. The laminations 28 may be insulated from one another by a thin non-conductive coating. In other embodiments, another ferromagnetic material may be used. The stator assembly 22 may include the aforementioned windings for energization.

The rotor assembly 24 includes a core 30 which includes the stack of laminations 28, which are configured to receive a shaft 34. The laminations in the stack of laminations 28 may be stamped or otherwise formed, and are made of a ferromagnetic material and may be insulated from one another by a thin non-conductive coating, or may be made of another material. End rings 42, 44 are formed at the ends of the core 30. In the current embodiment, the end rings 42, 44 are fabricated of an aluminum material for light weight and to provide structural integrity. The rotor assembly 24 is configured with a number of poles to create the magnetic circuit of the rotor assembly 24, which depends on the angular position of the rotor assembly 24, for interacting with that induced by the stator assembly 22 of the electric machine 20. These poles may be created, at least in-part, by flux barriers as described below. The rotor's magnetic field may be generated by a source such as permanent magnets or electrical conductors/coils. The rotor assembly 24 may desirably rotate at high speeds and may have internal openings/cavities based on the desired design of the magnetic features of the rotor assembly 24. Because the magnetic design may lead to preferred narrow structures, high speed operation may lead to a desire to strengthen those narrow structures, such as through use of the system 11.

Figure 3:
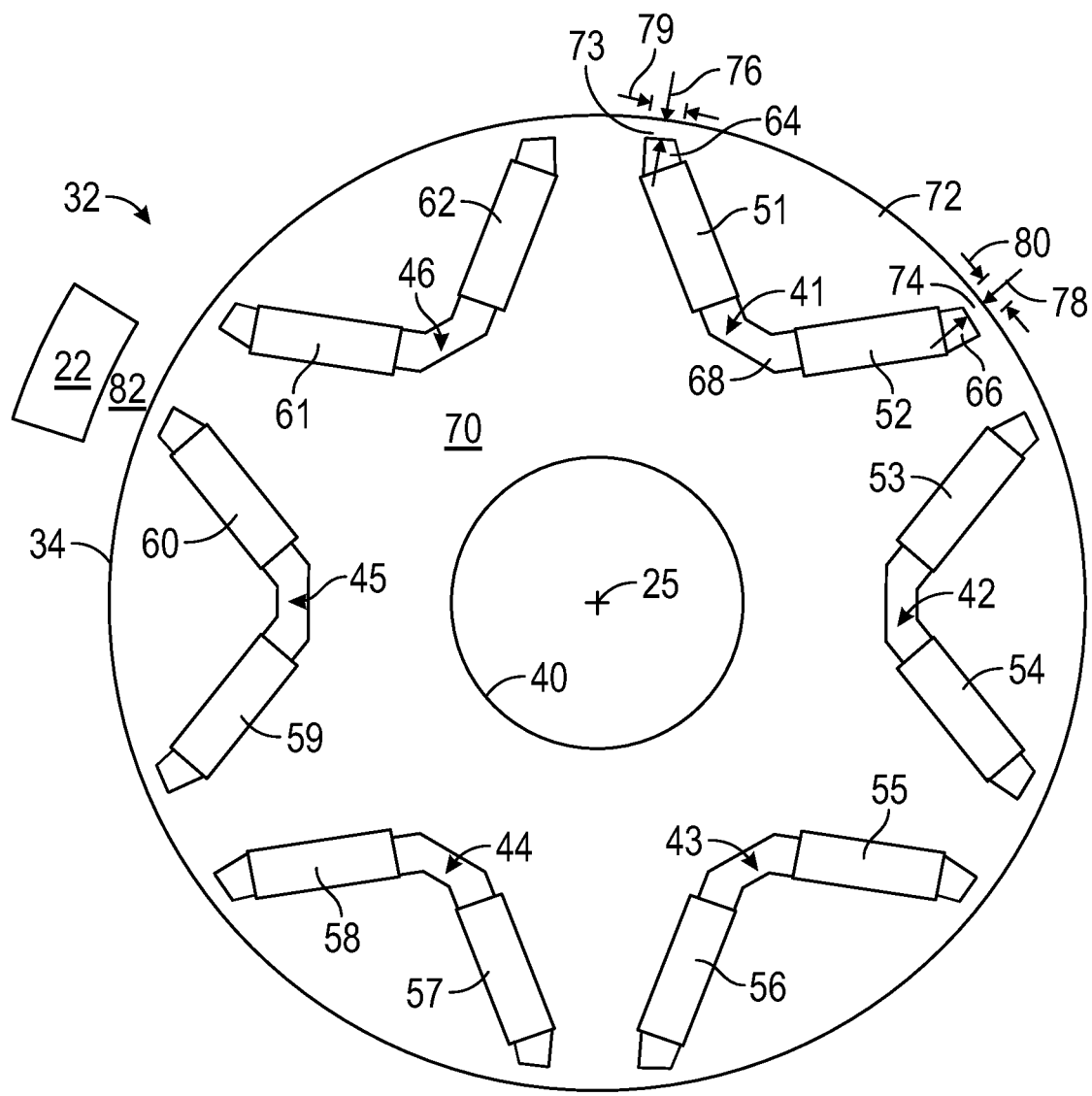
FIG. 3 is a face view of one lamination of the electric machine of FIG. 2, in accordance with various embodiments.

One lamination 32 of the core 30 of the rotor assembly 24 is illustrated in FIG. 3. The lamination 32 includes a number of openings, including a center opening 40 and other openings referred to as cavities, that may serve multiple purposes. Distributed around the lamination 32 near its outer perimeter are six cavities 41-46, each formed as an angled configuration. The cavities 41-46 extend through the stacked rotor laminations 32 of the core 30 in a longitudinal direction, which is parallel to the axis 25. The cavities 41-46 operate as barriers to magnetic flux and help define the magnetic poles of the rotor assembly 24. The cavities 41-46 may each contain a magnetic element source when assembled in the rotor assembly 24. In the current embodiment, the magnetic sources are permanent magnets 51-62.

Cavity 41 will be described as a representative of the other cavities 42-46, which are constructed in a like manner. The cavity 41 comprises a vee shaped opening with sides 64, 66 of the vee shape angling away from one another in a radially outward direction from a common base 68 of the sides 64, 66 that is located at a radially inward end of the vee shape. Cavity 41 defines structural features of the remaining steel of the lamination 32, which includes a main body 70, an outer land 72 that is generally triangular in shape, and defined bridges 73, 74. In the current embodiment, twelve bridges are included in the laminations 32 for the six cavities 41-46, with the bridges 73, 74 being representative of the other ten bridges of the cavities 42-46. The bridges 73, 74 hold the outer sections of the lamination 32 together against rotationally induced forces during operation of the electric machine 20. The bridges 73, 74 may also help mechanically retain the magnets 51, 52. As such, the bridges 73, 74 are subjected to forces during rotation of the rotor assembly 24, both due to the mass of the core 30 and the mass of the magnets 51, 52.

Additional structural features may be included for structural support. For example, struts (not illustrated) may be included. For example, one strut may extend across the cavity 41 at is base 68 such as by spanning from the main body 70 to the outer land 72. Such struts would assist in maintaining the structure of the lamination 32 and maintaining the position of the magnets 51, 52. However, in the current embodiment, the magnetic design is optimized by omitting struts, which provides benefits such as are reduced magnetic leakage. As a result, the cavity 41 is one contiguous open space including the sides 64, 66 and the base 68. Due to the omission of struts, the profile of the lamination 32 is strengthened according to the methods disclosed herein, including by providing thicknesses 76, 78 to the bridges 73, 74 sufficient to provide the requisite structural strength when treated via the system 11 and the methods described below.

In a number of embodiments, the lengths 79, 80 of the bridges 73, 74 are maximized to the extent allowed by the magnetic design of the core 30. Maximizing the lengths 79, 80 results in a low thermal mass of the centers of the bridges 73, 74 facilitating heating and minimizing heat propagation to the other areas of the lamination 32 where heat treatment is not desired. The thicknesses 76, 78 of the bridges 73, 74 is set at a magnitude that is equal to, or greater than the size of a gap 82 between the rotor assembly 24 and the stator assembly 22. It has been found that this level of thickness is challenging to treat to achieve austenite formation all the way through to the centers of the bridges with surface alloying penetration. The thicknesses 76, 78 may be greater where greater strength is needed. For maximized strength, hardening of the bridges 73, 74 through the entire thickness 76, 78 is preferred. The thicknesses 76, 78 of the bridges 73, 74 and the need to avoid melting the lamination coating outside the bridges 73, 74 makes the strengthening challenging. Accordingly, the systems and processes described herein are beneficial at achieving the requisite bridge strength.

As shown in FIG. 4, the fixture 19 is tailored to the task of heating the bridges of the cavities 41-46, including the bridges 73, 74. A stack 86 of several laminations 32, such as 15-50 laminations or more/less, is inserted into the fixture 19 for strengthening of the bridges 73, 74, et al. The fixture 19 includes a base 88, such as a metal plate, the inductor 17, and the cooling system 13. The inductor 17 is shaped and formed to surround the bridges including the bridges 73, 74. Describing the area of the cavity 41 as representative of the cavities 41-46, the inductor 17 includes conductors 91-94 as segments. The conductor 91 extends along the lamination stack 86 at its outer perimeter 90 at the outer side of the bridge 73. The conductor 92 extends through the cavity 41 at and adjacent the inner side of the bridge 73, which is at the radially outermost end of the side 64. The conductor 93 similarly extends along the lamination stack 86 at its outer perimeter 90 at the outer side of the bridge 74. The conductor 94 extends through the cavity 41 at the inner side of the bridge 74, which is at the radially outermost end of the side 66. As such, the conductors 93, 94 are positioned to induce magnetic fields in the bridge 74 and to heat the bridge 74. The bridges 73, 74 act as the "core," for the magnetic flux generated by the inductor 17. In embodiments, an added core/flux concentrator may be employed to reduce the excitation effort needed for the required heating. In embodiments, the conductors 91, 92 are positioned to induce magnetic fields in the bridge 73 and to heat the bridge 73 as a result. To do so, the inductor 17 (via the individual conductors e.g. 91, 92), extend along the outer surface(s) of the bridges (e.g. bridge 73) to induce magnetic fields in the bridge 73. The individual conductors 91, 92 of the inductor 17 are positioned near the outer perimeter 90 at the bridges, such as bridge 73 and near the inner perimeter of the bridges, such as bridge 73 in the cavity 41, and extend longitudinally along the height of the lamination stack 86.

The cooling system 13 includes a number of elements 101-124 that are positioned in contact with, or in close proximity to, the lamination stack 86. Elements 101-112 encircle the outer perimeter 90 of the lamination stack 86. The elements 101-112 cover the entire outer perimeter 90 except at the locations of the inductor 17 and its conductor segments. The cooling system 13 includes elements 113-124 that extend through the cavities 41-46, generally in the positions occupied by the magnets 51-62. The elements 113-124 are positioned in contact with, or in close proximity to, the lamination stack 86. In the current embodiment, the elements 101-124 are metal blocks connected to the base 88 to conduct heat away as a heat sink. In other embodiments, the elements 101-124 may have liquid coolant circulated through their interiors. Accordingly, the bridges, including the bridges 73, 74, are targeted for heating with the remainder of the laminations stack 86 cooled, such as to protect the insulative/dielectric coating of the individual laminations. As illustrated in FIG. 4, the lamination stack 86 may be inserted into the fixture 19 and conductors of the inductor 17 may be connected as described below.

Referring to FIGS. 5-8, certain steps of processing the lamination stack 86 are illustrated. In FIG. 5, the lamination stack 86 is constructed from several individual laminations 32, and an alloying material such as an austenite former 130 is selectively applied to the constructed lamination stack 86 by an applicator 132. The applicator 132 may apply the material via rolling, spraying, spreading, immersing, plating, or otherwise. The austenite former 130 is a material that results in austenitizing the bridges of the cavities 41-46, such as the bridges 73, 74, when heated by the system 11. The austenite former 130 is applied to the surfaces of the lamination stack 86 only at the bridges, for example at the bridges 73, 74. The austenite former 130 may be selected from the materials such as carbon (C), nitrogen (N), manganese (Mn), nickel (Ni), molybdenum (Mo), chromium (Cr), silicon (Si), a combination thereof, and/or another material appropriate to strengthen the steel material of the laminations 32 through surface application of an alloying material and heating induced diffusion/penetration.

In FIG. 6, the fixture 19 is presented, ready for receipt of the lamination stack 86. The fixture 19 includes the inductor 17 and is coupled with the induction current generator 15 and the cooling system 13. The inductor 17 includes the conductors 91-94, which extend from the base 88. Cooling system 13 includes the elements 113, 114, 115, 124 which also extend from the base 88. The elements 113, 114, 115, 124 may be metal blocks connected to the base 88 to conduct heat away as a heat sink and/or they may have liquid coolant circulated through their interiors by the cooling system 13. The conductors 91-94 and the elements 113, 114, 115, 124 are presented ready to mate with the lamination stack 86 with the austenite former 130 applied.

As shown in FIG. 7, the lamination stack 86 is mated with the fixture 19. The conductors 91-94 extend above the lamination stack 86. As shown in FIG. 8, An upper platen 136 is applied to the fixture 19 and engages the conductors 91-94. The upper platen 136 completes the loop of the coil of the inductor 17 as defined by the conductors 91-94. On the excitation side as supplied by the induction current generator 15, the conductors 91-94 are already connected. By including the upper platen 136, the conductors 92 and 94 are able to extend through the cavity 41. When the lamination stack 86 is loaded in the fixture 19 and the upper platen 136 is applied, the inductor 17 may be energized to heat the bridges including the bridges 73, 74.

Figure 9:
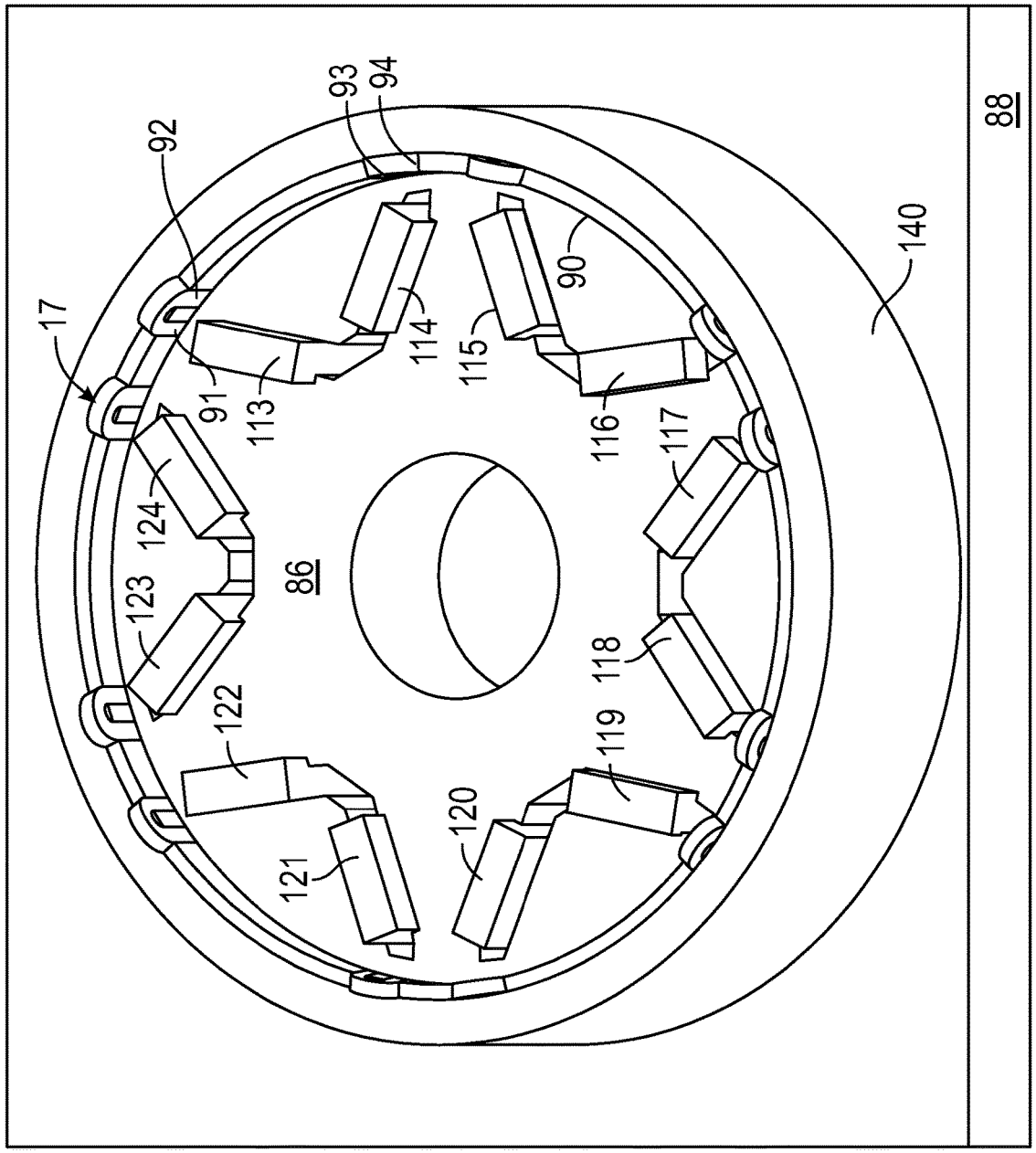
FIG. 9 is a schematic, perspective illustration of a partial lamination stack of the electrical machine of FIG. 2 as a workpiece in a fixture of the apparatus of FIG. 1, in accordance with various embodiments.

As shown in FIG. 9, illustrated is an embodiment of the fixture 19 that obviates a need for the upper platen 136 of FIG. 8. The conductors of the inductor 17, including the conductors 91-94 are all disposed outside the lamination stack 86 at its outer perimeter 90. The cooling elements 113-124 extend through the cavities 41-46. A flux concentrator 140 encircles the lamination stack 86 at its outer perimeter 90 and also encircles the conductors of the inductor 17. The flux concentrator 140 acts as "back iron" to direct the magnetic flux into the bridges (e.g., bridges 73, 74). The flux concentrator 140 improves heating efficiency by improving the electromagnetic coupling between the lamination stack 86 and the conductors of the inductor 17. The flux concentrator 140 directs the magnetic flux at the bridges and intensifies the magnetic flux in the direction of the bridges. The flux concentrator may be constructed from stacked thin sheets of electrical steel coated to increase the electrical resistance between sheets, from a magnetic composite material such as a powdered ferromagnetic material with a dielectric bonding, or otherwise as appropriate for directing and concentrating flux. The flux concentrator 140 is formed in an annular/ring-like shape with an open center that surrounds the lamination stack 86. It enables placement of the conductors of the inductor 17 outside the lamination stack 86, so that the conductors form a complete coil circuit at all times.

Figure 10:
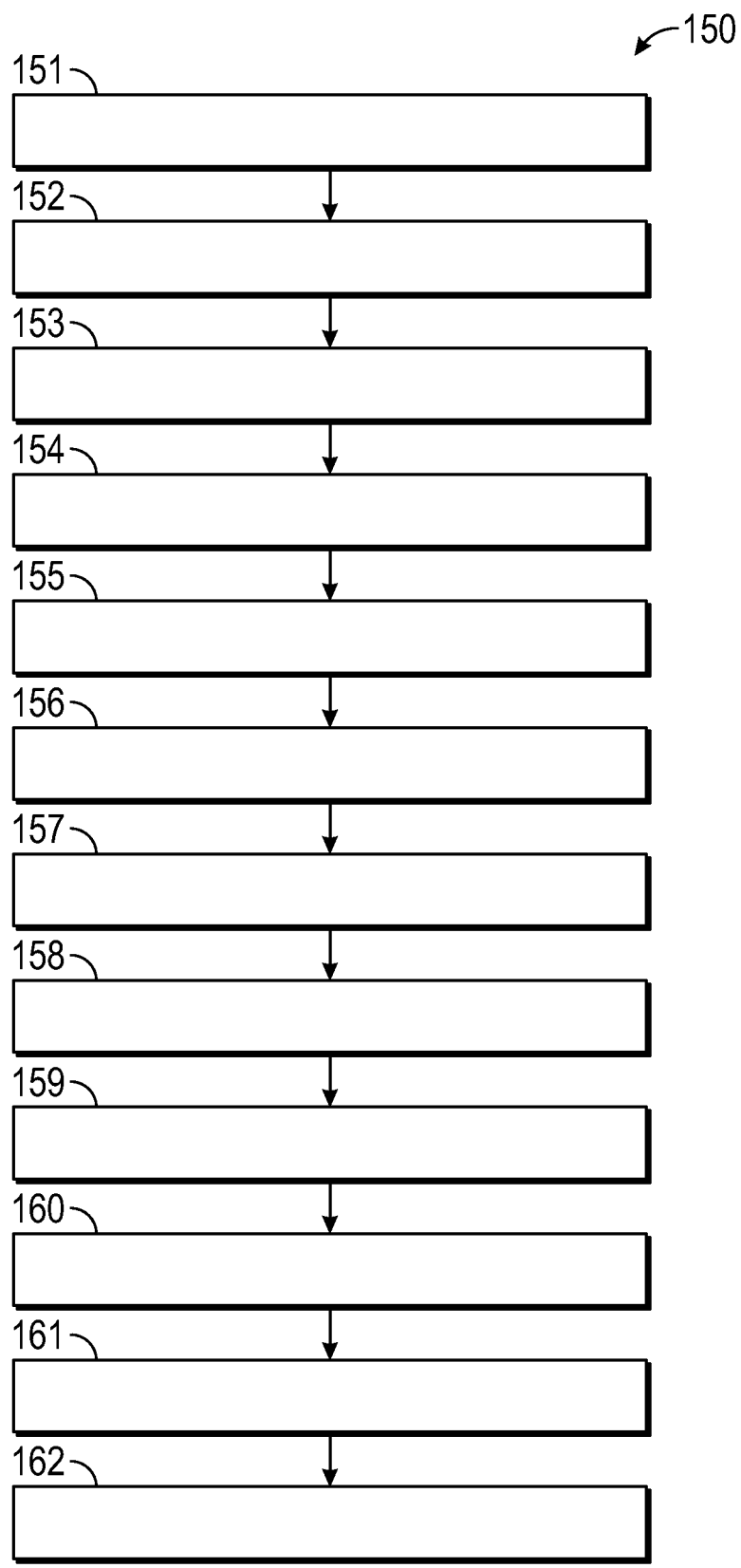
FIG. 10 is a flowchart of processing the lamination stack of FIG. 4, in accordance with various embodiments.

Referring to FIG. 10, a process 150 details treatment of the rotor laminations 32 in flowchart form. The process 150 begins with forming 151 the individual laminations 32 such as by stamping. The laminations 32 are formed with the cavities 41-46 in place and the center opening 40 for the shaft 34 formed. The individual laminations 32 are coated 152 with an insulative/dielectric coating such as a C4 or C5 class coating material. Coating 152 may be completed before or after stamping the laminations 32. The coating is applied to the steel surface of each lamination 32 and cured, such as by heating. The coating may deteriorate or burn off at temperatures reached during induction heating surface treatment/diffusion and is therefore protected during further processing.

Several formed 151 and coated 152 laminations are stacked 153 forming the lamination stack 86. The austenite former 130 is applied 154 to the stacked lamination stack 86 at the bridges, including the bridges 73, 74, such as by the applicator 132. The lamination stack 86 is then loaded 155 in the fixture 19. In the case of the fixture 19 of FIG. 4, the upper platen 136 is then applied 156. In the case of the fixture of FIG. 9, no upper platen is applied. At this point the system 11 is ready for heating the workpiece 12 in the form of the lamination stack 86.

Application 157 of current to the inductor 17 is effected as supplied by the induction current generator 15 controlled by the controller 16. The heating results in surface alloying the bridges (e.g., bridges 73, 74), via the austenite former 130 with the deposited material penetrating a depth equal to the thickness of the bridges. The high frequency current supplied by the induction current generator 15 locally heats the bridges due to the flux path generated through the bridges. The excitation frequency of the induction heating coils is chosen such that the skin depth penetration is on order of the depth of the bridge thickness. Variable excitation frequency may be applied depending the temperature profile versus time and depth. For example, applying the current at varying excitation frequencies generates a variable temperature profile in the bridges over time to heat their surfaces at a first rate and to heat into the structural members to penetrate the austenite former at a second rate for rapid alloying. Heating 158 is effected for a predetermined heat time sufficient to cause a penetration of the austenite former 130 completely through the thickness of the bridges so that the bridge is made austenitic all the way to their centers. Temperatures in the bridges of approximately 1200-1300 degrees Celsius are achieved. The resulting alloyed and processed bridge material is strengthened by the formation 159 of an of austenite gamma-phase iron ($\gamma$-Fe) structure. FIG. 11 schematically shows austenite formation 159 throughout one bridge 73. The austenite former 130 may be applied at the outer perimeter of the laminations 32 at the bridges 73, 74, etc., and/or may be applied at the bridges 73, 74, etc. inside the cavities 41-46. The austenite former 130 penetrates through the center 164 and penetrates the entire bridge 73 depth by heat generated by the conductors 91 and 92. The resulting laminations 32 exhibit different magnetic performances in the alloyed bridges (e.g., bridges 73, 74), versus the other parts of the laminations 32 and has bi-permeability. The austenite former 130 may be applied at the outer perimeter of the laminations 32 at the bridges 73, 74, etc., and/or may be applied at the bridges 73, 74, etc. inside the cavities 41-46 so that it is disposed between the conductors e.g., 91, 92. The conductors 91, 92 extend along the bridge 73 with gaps in-between to induce fields in the bridge 73 so that the austenite former 130 permeates through the entire bridge 73.

Heat flow from the austenitized area into the interior of the workpiece 12 is conducted away 160 through the cooling system 13 to protect the coating 152 on the laminations 32 and to avoid deformation/warping. In addition, the cooling system 13 helps with rapid self-quenching and re-solidification in the bridges of the workpiece 12. The treated lamination stack 86 is then extracted 161 from the fixture 19 and assembled 162 in the rotor assembly 24 of the electric machine 20.

As a result, a rotor section of an electric machine is created as a stack of laminations with bridges. The bridges are formed as part of the laminations and their centers are made austenitic through surface application of an austenite former followed by a local heat-treating process. The width of the austenitic region in the bridge is at least equal or greater than the airgap between the stator and the rotor. The rotor assembly is built from multiple sections of treated lamination stacks. The assembled rotor may contain magnetic elements such as permanent magnets or conductive elements/windings in their cavities, which are mechanically retained through the resultant austenitic bridges. Producing rotor sections with austenitized bridges includes surface alloying the center of the outer bridges via an austenite former followed by local heat-treating of the alloy regions via an induction heater for maximizing the diffusion depth of the austenitic region in the bridges. A fixture for the local heat-treatment of the bridges includes an inductor/coil that either wraps around the bridges or faces the bridges from the outer perimeter of the lamination stack such that the magnetic axis of the coils magnetically aligns with the areas of the bridges which are being heated. The fixture also featuring a network of cooling elements such as cold elements/plates which are disposed in the rotor cavities or embrace it in places where local heating is not needed. The cooling protects the lamination coatings from overheating damage. The excitation frequency of the induction heating coils is chosen such that the skin depth penetration is on order of the depth of the bridge thickness. Variable excitation frequency may be applied depending the temperature profile versus time and depth, such as to heat the outer surface first and then move inward. The inductor heating coils/conductors may be actively cooled themselves, such as through the use of hollow conductors.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of making a rotor for an electric machine, the method comprising:
   forming laminations to have internal cavities and structural members adjacent the cavities;
   stacking a number of the laminations to form a lamination stack;
   applying an alloying material to the lamination stack at the structural members;
   placing the lamination stack in a fixture so that an inductor extends along the structural members and cooling elements extend through the cavities; and
   applying a current to the inductor to heat the structural members, alloying the alloying material into the structural members.

2. The method of claim 1, further comprising assembling, after the alloying, a number of the lamination stacks onto a shaft to form the rotor.

3. The method of claim 1, wherein the laminations are formed of electrical steel, the alloying material comprises an austenite former and the alloying comprises penetrating the austenite former into and completely through the structural members.

4. The method of claim 1, wherein the structural members comprise plural bridges at an outer perimeter of the laminations, and the alloying comprises alloying the plural number of bridges simultaneously.

5. The method of claim 4, wherein the inductor comprises first segments extending through the cavities adjacent each of the plural bridges, and second segments extending along the outer perimeter adjacent each of the bridges.

6. The method of claim 4, wherein the inductor comprises first segments extending along the outer perimeter adjacent each of the bridges, and second segments extending along the outer perimeter adjacent each of the bridges, and comprising encircling the outer perimeter with a flux concentrator prior to the applying of the current.

7. The method of claim 1, further comprising selecting an excitation frequency for the current so that the alloying is effected completely through the structural members.

8. The method of claim 1, wherein applying the current comprises applying the current at varying excitation frequencies to generate a variable temperature profile in the structural members over time to heat a surface of the structural members at a first rate and to heat into the structural members from the surface at a second rate.

9. The method of claim 1, further comprising assembling magnetic elements into the cavities so that the magnetic elements are retained in the cavities by the structural members.

10. The method of claim 1, further comprising coating the laminations with an insulative material; cooling, by the cooling elements, the lamination stack; and preserving the insulative material except at the structural members.

11. A system for making a rotor for an electric machine, the system comprising:
    a fixture having an inductor and cooling elements, the fixture configured to receive a lamination stack that comprises a stack of laminations and has cavities and structural members adjacent the cavities, so that the inductor extends along the structural members and the cooling elements extend through the cavities,
    wherein the fixture is configured to apply a current to the inductor to heat the structural members, alloying an alloying material into the structural members.

12. The system of claim 11, wherein the lamination stack is configured to stack onto a shaft to form a portion of the rotor.

13. The system of claim 11, further comprising an applicator configured to apply the alloying material to the lamination stack, wherein the laminations comprise electrical steel, the alloying material comprises an austenite former, and the fixture is configured to penetrate the austenite former into and completely through the structural members.

14. The system of claim 11, wherein the structural members comprise plural bridges at an outer perimeter of the laminations, and the fixture is configured to heat the plural number of bridges simultaneously.

15. The system of claim 14, wherein the inductor comprises first segments extending through the cavities adjacent each of the plural bridges, and second segments extending along the outer perimeter adjacent each of the bridges.

16. The system of claim 14, wherein the inductor comprises first segments extending along the outer perimeter adjacent each of the bridges, and second segments extending along the outer perimeter adjacent each of the bridges, and comprising a flux concentrator that encircles the outer perimeter.

17. The system of claim 11, wherein the fixture is configured to apply an excitation frequency of the current so that the alloying is effected completely through the structural members.

18. The system of claim 11, wherein the fixture is configured with an induction current generator to apply the current at varying excitation frequencies to generate a variable temperature profile in the structural members over time to heat a surface of the structural members at a first rate and to heat into the structural members from the surface at a second rate.

19. The system of claim 11, wherein the laminations are coated with an insulative material, and wherein the cooling elements are configured to cool the lamination stack and preserve the insulative material except at the structural members.

\* \* \* \* \*